(12) United States Patent
Vesterlund et al.

(10) Patent No.: US 6,361,254 B1
(45) Date of Patent: Mar. 26, 2002

(54) PROCESS AND APPARATUS FOR DRILLING HOLES IN THE SHELL OF A CYLINDER

(75) Inventors: Ingmar Vesterlund, Pyhäjoki (FI); Georg Kugler, Heidenheim (DE); Markus Oechsle, Bartholomä (DE); Peter Kahl, Gerstetten (DE)

(73) Assignees: Pikoteknik Oy, Parhalahti (FI); Voith Sulzer Papiermaschinen GmbH, Heidenheim (DE)

( * ) Notice: Subject to any disclaimer, the term of this patent is extended or adjusted under 35 U.S.C. 154(b) by 0 days.

(21) Appl. No.: 09/351,167

(22) Filed: Jul. 12, 1999

(30) Foreign Application Priority Data

Jul. 13, 1998 (FI) .................................................. 981598

(51) Int. Cl.⁷ .......................... B23B 39/16; B23B 35/00
(52) U.S. Cl. .......................... 408/1 R; 408/46; 408/51; 408/53
(58) Field of Search .......................... 408/1 R, 51, 53, 408/42, 92, 95, 46

(56) References Cited

U.S. PATENT DOCUMENTS

| | | | |
|---|---|---|---|
| 2,506,202 A | * 5/1950 | Folkerth, Sr. | |
| 3,849,018 A | * 11/1974 | Anderson | 408/46 |
| 4,674,925 A | * 6/1987 | Thornton et al. | 408/1 R |
| 5,090,846 A | * 2/1992 | Hakala et al. | 408/1 R |
| 5,140,749 A | * 8/1992 | Sailas | 29/895.2 |
| 5,277,524 A | 1/1994 | Chung | |
| 5,344,259 A | * 9/1994 | Rajala et al. | 408/46 |
| 5,401,232 A | * 3/1995 | Sailas | 492/38 |
| 5,927,909 A | * 7/1999 | Parvianinen et al. | 408/1 R |
| 6,099,449 A | * 8/2000 | Geiger | 408/46 |

FOREIGN PATENT DOCUMENTS

| | | | |
|---|---|---|---|
| DE | 2616550 | 10/1977 | |
| DE | 2701516 | 7/1978 | |
| EP | 0448947 | 10/1991 | |
| EP | 0545879 | 6/1993 | |
| FI | 91834 | 5/1994 | |
| FI | 971366 | 10/1998 | |
| FR | 2585599 | * 2/1987 | 408/46 |
| WO | 98/46386 | 10/1998 | |

* cited by examiner

*Primary Examiner*—Henry Tsai
(74) *Attorney, Agent, or Firm*—Greenblum & Bernstein, P.L.C.

(57) ABSTRACT

Process and apparatus for operating an apparatus to drill holes in the shell of a paper machine cylinder. The apparatus includes a stationary framework supportable on the paper machine, a feed frame that is radially movable along the stationary framework relative to the shell, and a drive unit. A plurality of drilling modules are coupled to the feed frame, which are rotatable via the drive unit, and the drilling modules include a drive shaft, at least two spindle heads, and at least two intermediate shafts arranged between the drive shaft and the at least two spindle heads, in which at least one of the at least two spindle heads in each drilling module is rotatable about a respective intermediate shaft of the drilling modules. The process includes rotating at least one of the at least two spindle heads about a respective intermediate shaft of the drilling module arranged between a drive shaft and the at least one spindle head, such that a mutual distance between spindle shaft centers of the at least two spindle heads in the drilling modules is adjusted.

15 Claims, 6 Drawing Sheets

PROCESS AND APPARATUS FOR DRILLING HOLES IN THE SHELL OF A CYLINDER

CROSS-REFERENCE TO RELATED APPLICATIONS

The present application claims priority under 35 U.S.C. §119 of Finnish Patent Application No. 981598, filed on Jul. 13, 1998, the disclosure of which is expressly incorporated by reference herein in its entirety.

BACKGROUND OF THE INVENTION

1. Field of the Invention

The present invention relates to a process for drilling holes in the shell of a cylinder such as a paper machine cylinder, without requiring removal of the cylinder from its operating position. The process utilizes a multispindle drilling apparatus including a device for controlling a distance between drill centers of adjacent drilling modules.

The present invention also relates to an apparatus for drilling holes in the shell of paper machine cylinder. The apparatus includes a stationary framework supportable on the paper machine and a feed frame movable along the stationary framework radially toward the shell of the cylinder. The feed frame is coupled to a plurality of drilling modules that are adapted for rotation via a drive unit.

2. Discussion of Background Information

Several types of equipment are known in the art for drilling holes in the shell of a cylinder in a paper machine. Examples of some embodiments of this type of equipment are disclosed in, e.g., patent publications EP-B-0448947 and EP-B-0545879.

In EP-B-0448947, a method and an apparatus are disclosed for on-site drilling of perforating holes in the shell of a cylinder, e.g., a dryer cylinder, in a paper machine, in which the cylinder need not be removed from the paper machine. The apparatus includes a spindle box equipped with a plurality of spindle heads adapted to be driven by a drive motor. The spindle box houses the drive motor which is arranged to move the spindle box relative to a framework of the drilling apparatus when the drills are actuated toward the cylinder surface to be machined. Further, the apparatus includes a drilling jig to support and tension the framework of the drilling apparatus between guideways and the shell of the cylinder to be machined. Further, the apparatus includes slide bushings arranged to guide the framework of the drilling apparatus along the guideway assembly when the apparatus is being moved into a next drilling position in the direction of the cylinder axis. The design of the apparatus uses guideways supported on the cylinder next to the cylinder being machined.

In EP-B-0545879, a further development of the above-outlined apparatus is disclosed in which each spindle head is provided with a separate slide frame that is adapted to be individually movable in the lateral direction.

These prior art apparatuses are hampered, among other drawbacks, by their complicated construction which results in, e.g., a limited range of spindle head movement. Furthermore, the system requires the use of a drilling jig, such that each different drilling pattern requires an individual drilling jig.

SUMMARY OF THE INVENTION

The present invention provides an entirely novel type of process and apparatus for drilling holes the shell of a cylinder in which the above-noted drawbacks of the prior art techniques are overcome.

The invention provides a multispindle drilling apparatus that includes drilling modules having at least two spindle heads. Moreover, a mutual distance of (i.e., a distance between) spindle shaft centers in each drilling module is adjustable by rotating the spindle heads of at least one drilling module about a respective intermediate shaft of the drilling module.

In an exemplary embodiment of the present invention, a process for setting a drilling pattern includes rotating one of a body of the drilling module or the drilling head of the drilling module about a central drive shaft of the drilling module.

The process can further include altering a mutual position of adjacent drilling modules with respect to each other.

The apparatus of the present invention includes drilling modules having at least two spindle heads. At least one spindle head in each drilling module is rotatable about an intermediate shaft of the drilling module.

In the exemplary embodiment of the apparatus, one of the drilling module or the spindle head is rotatable about the central drive shaft of the module. The apparatus can also include locking devices to hold the module or head into a desired position.

In a further embodiment, a feed frame of the apparatus can be coupled to a plurality of drilling modules and at least some of the modules can be arranged for movement in the lateral direction.

The process and apparatus according to the present invention offer a number of significant benefits. For example, the use of multispindle drilling modules and the positioning of the drilling modules as well as the positioning of the spindle heads within each drilling module via rotation about respective intermediate shafts can provide an extremely wide latitude in the position control of the drilling modules. The position control possibilities may be further extended by using drilling modules adapted to be rotatable about the central drive shaft of the module. Thus, the present invention facilitates drilling without requiring drilling jigs.

The present invention relates to a process for operating an apparatus to drill holes in the shell of a cylinder, such as a paper machine cylinder. The apparatus includes a multispindle drilling arrangement having a plurality of drilling modules with at least two spindle heads and a device for controlling a distance between drill centers of adjacent drilling modules. The process includes rotating at least one of the at least two spindle heads about a respective intermediate shaft of the drilling module arranged between a drive shaft and the at least one spindle head, such that a mutual distance between spindle shaft centers of the at least two spindle heads in the drilling modules is adjusted.

According to a feature of the present invention, the process can include rotating at least one of a body of the drilling modules and a drilling head of the drilling module about a central drive shaft of the drilling module.

In accordance with another feature of the invention, the process can further include altering a mutual positioning between adjacent drilling modules with respect to each other.

In accordance with still another feature of the instant invention, the process can further include aligning the at least two spindle heads to be parallel to an axis of the cylinder to be drilled.

According to a further feature of the invention, the process may further include moving the at least two spindle heads in a direction toward the surface of the cylinder to be drilled.

According to still another feature of the present invention, the process can include driving each of the at least two spindle heads with a single drive device.

In accordance with a still further feature of the instant invention, the process can include driving each of the at least two spindle heads with a single drive train.

In accordance with another feature of the present invention, the process can further include securing the at least one of the at least two spindle heads, such that the mutual distance between spindle shaft centers of the at least two spindle heads is held constant.

The present invention also relates to an apparatus for drilling holes in the shell of paper machine cylinder. The apparatus includes a stationary framework supportable on the paper machine, a feed frame that is radially movable along the stationary framework relative to the shell, a drive unit, a plurality of drilling modules coupled to the feed frame, which are rotatable via the drive unit. The drilling modules include a drive shaft, at least two spindle heads, and at least two intermediate shafts arranged between the drive shaft and the at least two heads, in which at least one of the at least two spindle heads in each drilling module is rotatable about a respective shaft of each drilling module.

According to a feature of the instant invention, at least one of the drilling module and a drilling head of the drilling module can be rotatable about a central drive shaft of the drilling module. Further, a locking device can be provided for fixing the one of the drilling module and the drilling head into a desired position.

In accordance with a further feature of the present invention, at least one of the plurality drilling modules may be movable in a lateral direction.

In accordance with still another feature of the invention, an actuation device can move the feed frame toward a surface of the cylinder to be drilled.

According to another feature of the present invention, the stationary frame can include at least one guideway, and the feed frame may be slidably coupled to the at least one guideway.

According to still another feature of the instant invention, each drilling module can include a drive pulley coupled to a respective drive shaft, and each drive shaft may be concentrically arranged along a respective central axis of the drilling modules. Further, a first gear can be positioned to couple the drive shafts to the respective intermediate shafts. Still further, the first gear can be coupled to the drive shaft for driving the at least one of the at least two spindle heads. Further still, a drive belt can be positioned to drive each drive shaft via the drive unit.

The present invention also relates to an apparatus for drilling holes in the shell of paper machine cylinder. The apparatus includes a plurality of drilling modules, and the plurality of drilling modules include a drive shaft, at least two spindle heads, and at least two intermediate shafts arranged between the drive shaft and the at least two spindle heads, in which at least one of the at least two spindle heads in each drilling module is rotatable about a respective intermediate shaft of the drilling modules.

According to yet another feature of the instant invention, a coupling device can be coupled to the plurality of drilling modules adjacent to a cylinder in a material web production machine to be drilled. During drilling, the cylinder to be drilled is located in an operational position within the material web production machine.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

In the context of the present invention, the term "paper machine" is used for the purposes of explanation and illustration, but it is understood that the present invention can be utilized with other material web producing machines, e.g., a paper machine, a cardboard machine, or a cellulosic web dryer, without departing from the spirit of the invention. Moreover, the term cylinder is used to generally refer to cylindrical objects, e.g., rolls, dryer cylinders, etc.

Figure 1:
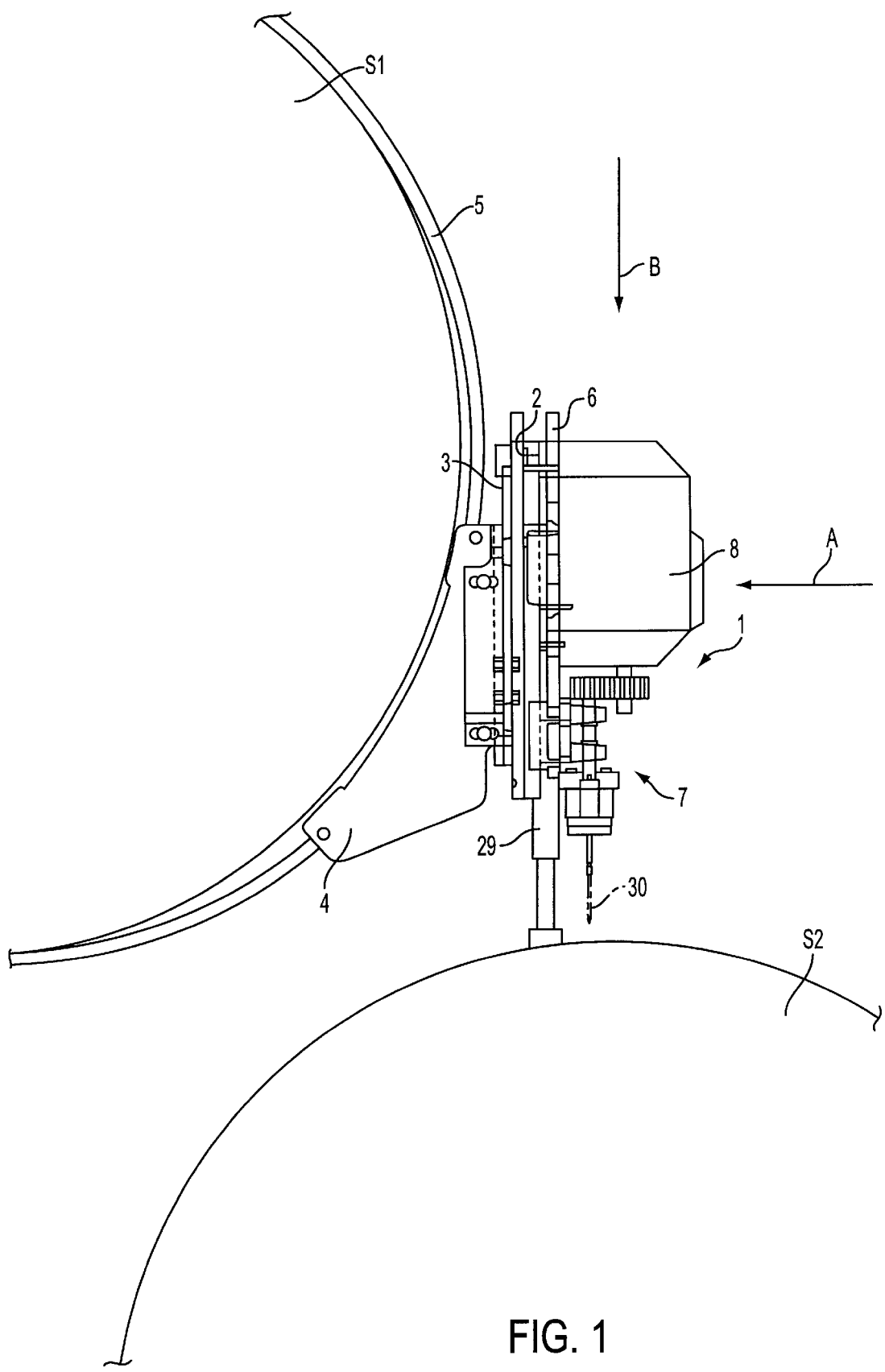
FIG. 1 schematically illustrates an apparatus according to the invention installed on site into its operating position.

As illustrated in FIG. 1, an exemplary embodiment of apparatus 1 according to the invention is shown in its operating position supported on the structure of a paper machine, such as a first cylinder s1 of the paper machine. Cylinder s2 to be drilled may be positioned to be laterally offset below first cylinder s1. Apparatus 1 includes a framework 2 which is supportable on the structures of the paper machine. Framework 2 can be supported on first cylinder s1 via support members 3 and 4, and support member 4 may be formed, e.g., as a curved plate resting on the shell of cylinder s1, and coupled to framework 2. Apparatus 1 can be anchored by fastening belts 5 to the surface of first cylinder s1 so that framework 2 can be aligned essentially parallel to the axis of the cylinder s1 at least over a portion of the cylinder width.

Feed frame 6, which is supported by framework 2 and which is movable toward the surface of cylinder s2 being machined, may include a plurality of drilling modules 7 that are drivable via a drive unit 8. Guideways 9 can be coupled to framework 2 so that feed frame 6 can be moved along guideways 9 to provide the feed movement of drilling modules 7, as well as a withdrawal movement away from the cylinder surface after completion of the drilling step. Drilling modules 7 may include at least two spindle heads. The exemplary embodiment illustrated in FIG. 2 shows six two-spindle drilling modules 7 which can be adapted to be simultaneously driven by drive unit 8.

Figure 4C:
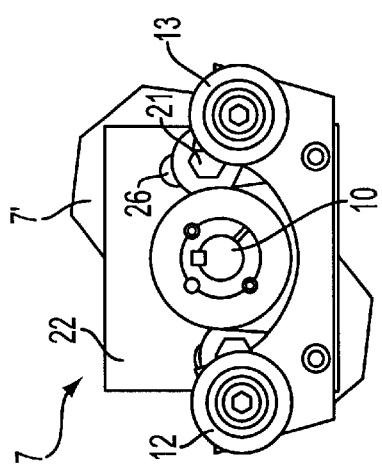
FIGS. 4A–4C illustrate a drilling module of the apparatus according to the invention.

Each drilling module 7 includes a central drive shaft 10 which, in the exemplary illustration, is belt-driven. The belt drive train is accomplished by providing drive shaft 10 (FIG. 4A) with a belt drive pulley 11 and drilling module 7 with belt idler pulleys 12 and 13 (FIG. 4C). A first gear wheel 14 (see FIG. 5) is coupled to rotate with drive shaft 10 and adapted to drive a gear transmission 16 including an intermediate shaft 15 that further drives a spindle shaft 17. In the illustrated embodiment of FIG. 5, each drilling head 7' includes two spindle heads 18 and 18', which can be driven in the above-described manner by drive shaft 10. At least one spindle head 18 and 18' in each drilling module is arranged to be rotatable about intermediate shaft 15 and 15' of drilling head 7'. Thus, a mutual distance between spindle shaft centers 19 and 19' can be separately adjusted in each drilling head 7' by rotating at least one spindle head 18 and 18' in the drilling module about its respective intermediate shaft 15 and 15'. Furthermore, the entire drilling head 7', or at least the spindle head 18 housing spindle shafts 17 can be arranged to be rotatable about drive shaft 10, which can be performed either manually or with an appropriate control or positioning device. In this manner, it is possible to control the drilling pattern produced by each drilling head 7'. As a result, spindle shaft centers 19 and 19' of a two-spindle drilling module can be readily aligned along a desired line.

Each drilling module 7 further includes locking devices 20 and 21 (FIG. 4B) for locking drilling head 7' into a desired position. Drilling module 7 can also include a mounting plate 22 (see FIGS. 4A–4C) that is coupled to bearing assemblies 23 and 24 of drive shaft 10, as well as to support elements 25 for mounting belt idler pulleys 12 and 13. Spindle head mounting plate 22 can be provided with holes, slots or similar openings 26 for fixing drilling head 7' into a desired position via fasteners 20 and 21, e.g., screws or bolts. Drilling heads 7' can be mounted by their respective mounting plates 22 to be movable along guideway 33, which is coupled to feed frame 6. Accordingly, control of the layout or arrangement of the drilling pattern can be obtained by changing the position of drilling modules 7 along feed frame 6. In FIG. 2, such a position control possibility is indicated by arrows.

Figure 2:
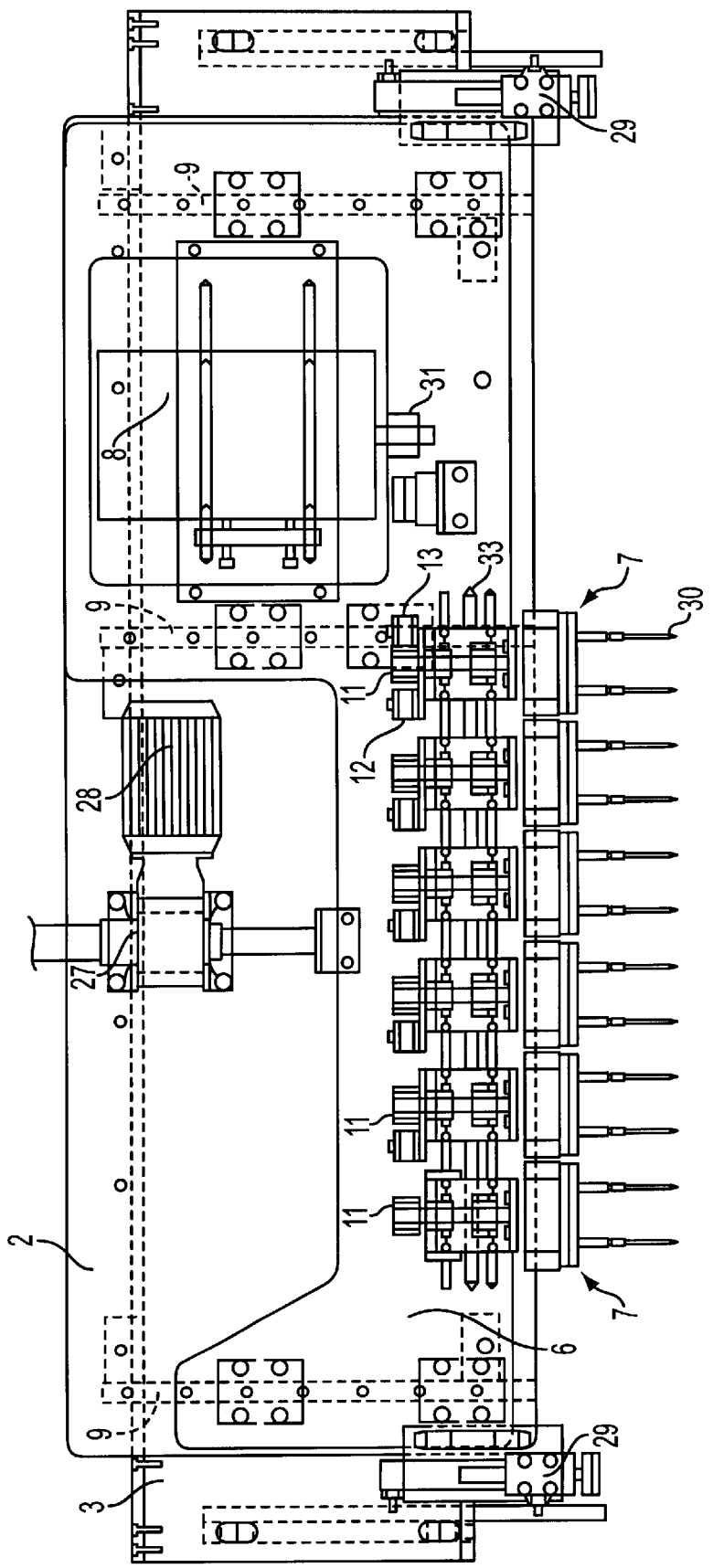
FIG. 2 illustrates a view of the apparatus according to the invention in direction II marked in FIG. 1.
Figure 3:
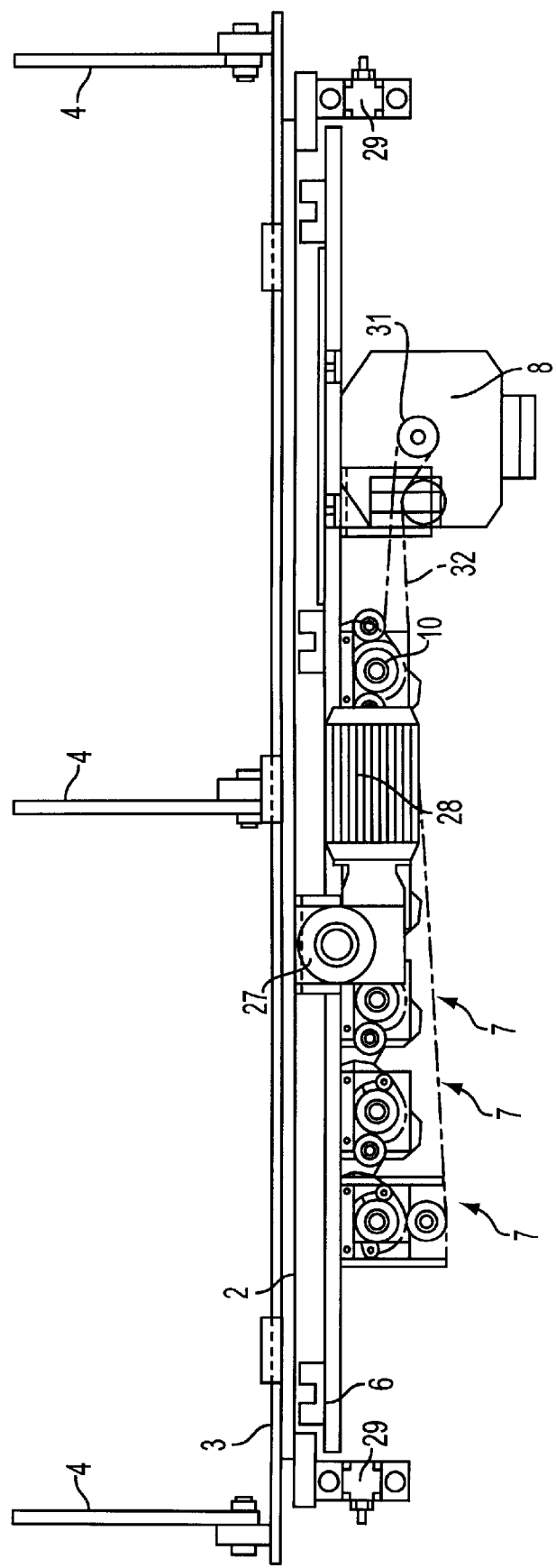
FIG. 3 illustrates a view of the apparatus according to the invention in direction III marked in FIG. 1.

In FIGS. 2 and 3, drilling apparatus 1 is schematically illustrated as coupled to framework 2. Framework 2 can include a mounting member 3 to which the curved backing plates 4 can be connected. Framework 2 may include guideways 33 for moving feed frame 6, and an actuator assembly 27 and 28 of feed frame 6, which is capable of moving feed frame 6 relative to framework 2. The actuator assembly of feed frame 6 can include a conventional screw lift tack) 27, driven by a drive motor 28. As shown, a plurality of parallel drilling modules 7 can be coupled to feed frame 6 so as to be driven by a common drive unit 8, which is also mounted on feed frame 6.

Framework 2 can be provided with support members 29, e.g., pneumatic cylinders, which, prior to the machining operation, can be driven against the surface of cylinder s2 to be machined so as to eliminate any possible play. In particular, it is noted that the instability in the bearings of cylinder s1 and the support structures thereof, which act as a mounting base for drilling apparatus 1 can thus be minimized, whereby the drilling operation becomes very stable and, thus, more accurate. Moreover, this arrangement prevents, e.g., unwanted movements of the drilling apparatus during the drilling operation which substantially eliminates the breaking of drills 30.

The drilling operation occurs as follows: drilling apparatus 1 is mounted on cylinder s1, which is the closest adjacent cylinder to cylinder s2 to be machined, via fastening belts 5. Spindle heads 18 of drilling modules 7 can be adjusted into a desired position, so as to provide a desired distance between spindle head centers 19 and 19'. Drilling head 7' of the drilling module 7 can be rotated around drive shaft 10 if necessary to locate, e.g., align, the spindle head centers in a desired arrangement. In this regard, mutual distances between adjacent drilling modules 7 can be set as required to obtain the desired drilling pattern. Support members 29 can be driven against the surface of cylinder s2 to be machined, and, via actuator assembly 27 and 28, feed frame 6 can be moved toward cylinder s2 to be machined. Finally, rotary drive unit 8 of spindle heads 18 (and drills 30) can be switched on. After completion of drilling, these actions are repeated in a reverse order.

Cylinder s2 being machined can be rotated between the drilling steps by a rotary drive system (not shown) about a cylinder shaft, e.g., incrementally, by a given angle into a next drilling position. One such type of rotary drive system is disclosed, e.g., in patent publication EP-B-0448947, the disclosure of which is expressly incorporated by reference herein in its entirety. However, this rotary drive system can rotate the cylinder only by increments determined by the pitch of the gear wheel mounted in the drive unit. Hence, each different size of incremental angle of rotation would need a separate gear wheel. To overcome this limitation, a conventional indexing wheel can be used to convert the increment angle of rotation into a suitable value. Cylinder s2 being machined is locked into a fixed position for the duration of the machining step.

In FIG. 3, rotational drive unit 8 for drilling modules 7 is partially visible. Drive unit 8, which can advantageously be, e.g., a conventional electric motor, transmits power feed from motor output shaft 31 via a belt transmission train 32 to drive shafts 10 of drilling modules 7. In this manner, the power feed is distributed individually to each spindle head 18 carrying a drill 30.

Figure 4A:
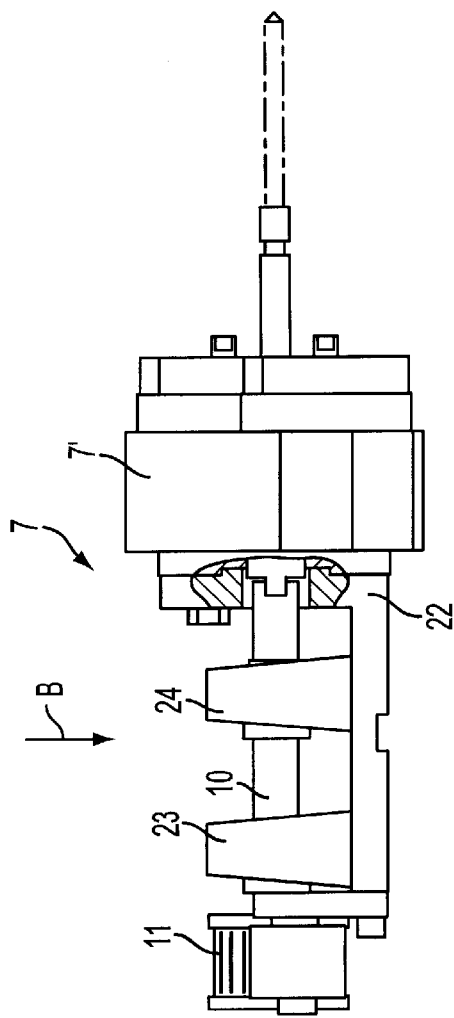
Figure 4B:
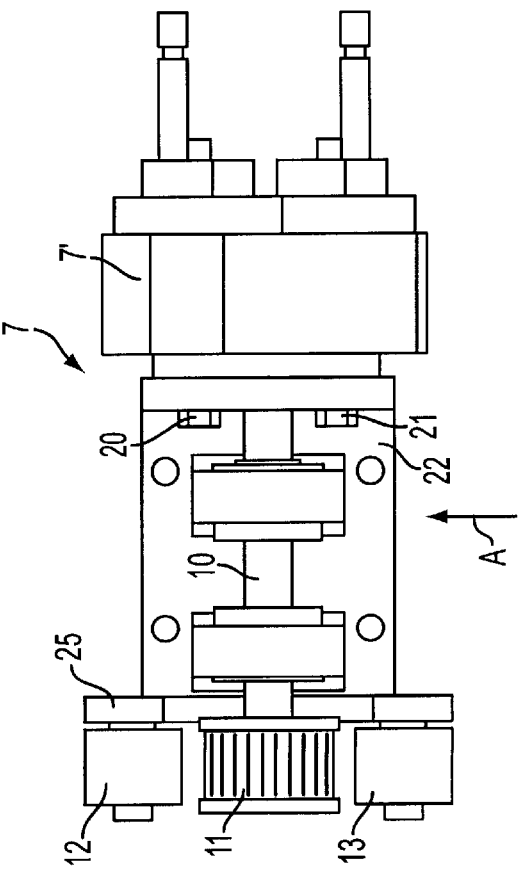
Figure 5:
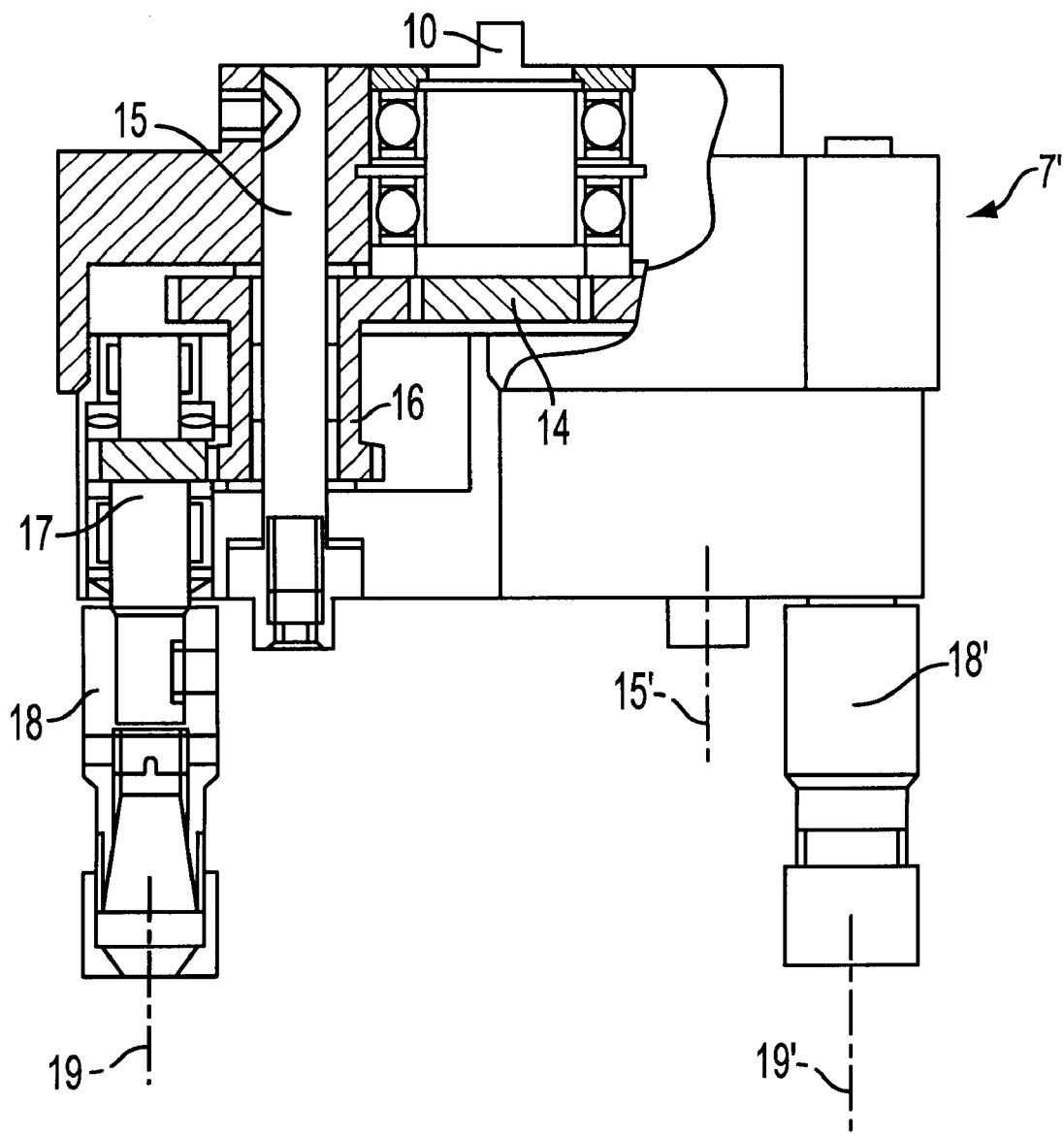
FIG. 5 illustrates a partially sectional view of a multi-spindle drilling module in the apparatus according to the invention.

In FIGS. 4A–4C one of the drilling modules 7 is depicted, and in FIG. 5 one drilling head 7' of drilling module 7 is depicted. Spindle shaft centers 19 and 19' are arranged to be rotatably adjustable about respective intermediate shafts 15 and 15'. While the illustrated embodiment shows two intermediate shafts, it is noted that this illustration is provided to facilitate understanding and should not be construed as limiting and more than two intermediate shafts can be provided.

Figure 6A:
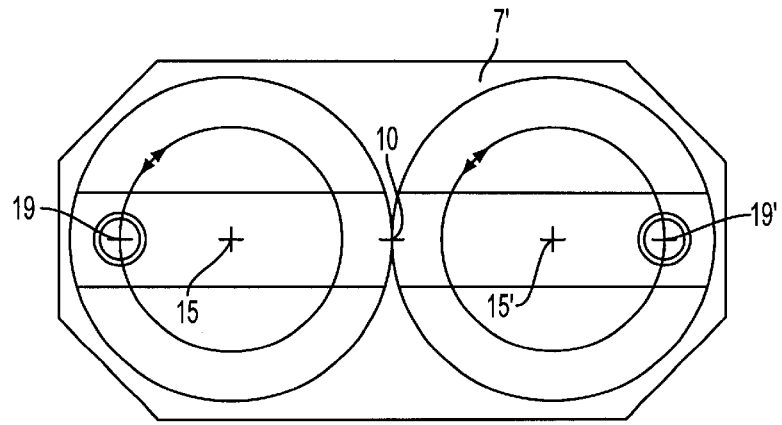
FIGS. 6A–6C schematically illustrate the position control arrangement of drills for one drilling module as seen from the direction of the cylinder being machined.
Figure 6B:
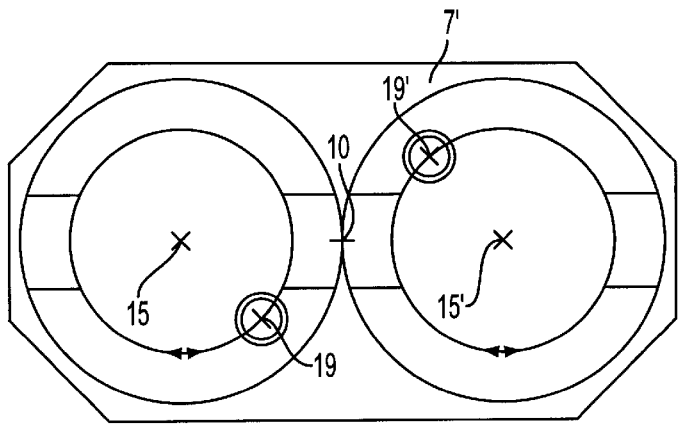
Figure 6C:
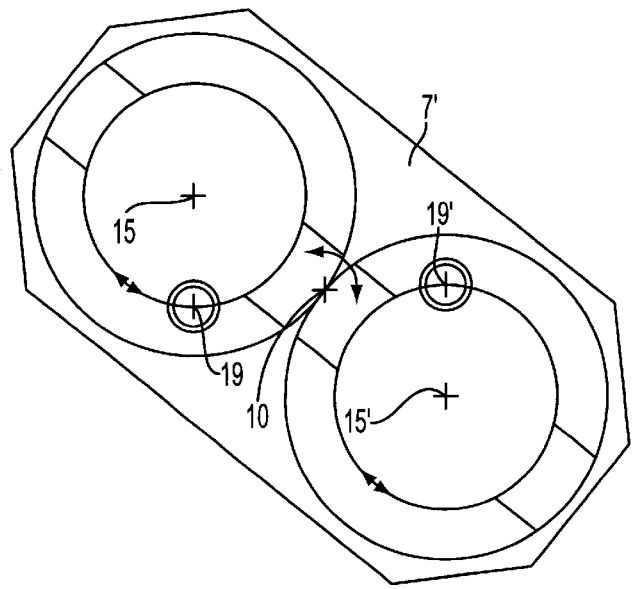

The position control of drilling module 7 is schematically illustrated in FIGS. 6A, 6B and 6C. In FIG. 6A, a mutual distance between spindle shaft centers 19 and 19' of two-spindle drilling head 7' is shown driven into a maximally outdistanced (i.e., spaced) position. However, drilling head 7' of drilling module 7 has not been rotated about drive shaft 10. In FIG. 6B, both spindle shaft centers 19 and 19' are shown rotated about respective intermediate shafts 15 and 15' so that a mutual distance between spindle shaft centers 19 and 19' becomes smaller than the arrangement depicted in FIG. 6A. However, it is also noted that the drills 30 are offset a distance from the centerline of drilling. When necessary, the drilling pattern may further be controlled by rotating the frame of drilling head 7' about center axis 10, whereby spindle shaft centers 19 and 19' can be aligned with the centerline of drilling.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A process for drilling holes in the shell of a paper machine cylinder with a multispindle drilling apparatus including at least two drilling modules in which each drilling module includes at least two spindle heads each having a spindle shaft center and a controlling device arranged to control a distance between the spindle shaft centers of a same drilling module and between the spindle shaft centers of adjacent drilling modules, the process comprising:

maintaining the cylinder in its operating position in the paper machine;

rotating the spindle shaft centers of a same drilling module about an intermediate shaft, thereby adjusting a distance between the spindle shaft centers of the same drilling module;

rotating the drilling modules about a central drive shaft;

laterally moving at least some of the at least two drilling modules, thereby adjusting a distance between spindle shaft centers of adjacent drilling modules; and drilling the shell of the paper machine cylinder while it is maintained in its operating position in the paper machine.

2. The process in accordance with claim 1, further comprising aligning the at least two spindle heads to be parallel to an axis of the cylinder to be drilled.

3. The process in accordance with claim 1, further comprising moving the at least two spindle heads in a direction toward the surface of the cylinder to be drilled.

4. The process in accordance with claim 1, further comprising driving each of the at least two spindle heads with a single drive device.

5. The process in accordance with claim 1, further comprising driving each of the at least two spindle heads with a single drive train.

6. The process in accordance with claim 1, further comprising securing the at least one of the at least two spindle heads, such that the mutual distance between spindle shaft centers of the at least two spindle heads is held constant.

7. An apparatus for drilling holes in the shell of paper machine cylinder in a paper machine, comprising:

a stationary framework arranged to be supported on structures of the paper machine;

a feed frame arranged for movement along said stationary framework and radially toward the shell of the paper machine cylinder, said feed frame comprising a plurality of rotatably mounted drilling modules, each drilling module comprising at least two spindle shafts, each having a shaft center arranged to adjust a mutual spacing between said at least two spindle shaft centers of each drilling module, wherein at least some of said plurality of drilling modules are laterally positionable along said feed frame;

each drilling module comprising an intermediate shaft and a central drive shaft, wherein at least one of the at least two spindle shafts are movable around said intermediate shaft, and each said drilling module is rotatable around its said central drive shaft; and a locking device for maintaining a position of said modules and said spindle shafts.

8. The apparatus in accordance with claim 7, further comprising an actuation device that moves said feed frame toward a surface of the cylinder to be drilled.

9. The apparatus in accordance with claim 7, said stationary frame comprising at least one guideway;

said feed frame being slidably coupled to said at least one guideway.

10. The apparatus in accordance with claim 7, each of said drilling modules comprising a drive pulley coupled to a respective drive shaft;

each of said drive shafts being concentrically arranged along a respective central axis of the drilling modules.

11. The apparatus in accordance with claim 10, further comprising a first gear positioned to couple said drive shafts to said respective intermediate shafts.

12. The apparatus in accordance with claim 10, further comprising a first gear coupled to said drive shaft for driving said at least one of said at least two spindle shafts.

13. The apparatus in accordance with claim 10, further comprising a drive belt positioned to drive each of said drive shafts via said drive unit.

14. The apparatus in accordance with claim 7, further comprising a coupling device for coupling said plurality of drilling modules adjacent to a cylinder in a material web production machine to be drilled.

15. The apparatus in accordance with claim 14, wherein, during drilling, said cylinder to be drilled is located in an operational position within said material web production machine.

* * * * *